Aug. 10, 1965     J. G. BAKER     3,199,664
VIBRATORY CONVEYOR
Filed Dec. 26, 1963

INVENTORS
Jacob G. Baker

BY Mason, Fenwick & Lawrence
ATTORNEYS

United States Patent Office 3,199,664
Patented Aug. 10, 1965

3,199,664
VIBRATORY CONVEYOR
Jacob G. Baker, P.O. Box 28248, Dallas 28, Tex.
Filed Dec. 26, 1963, Ser. No. 333,592
8 Claims. (Cl. 198—220)

The present invention relates to vibratory conveyors for providing conveyance to objects or materials by imparting a combination of vertical and horizontal components of movement to an active top surface of the conveyor in response to vibration of the top surface along the desired path.

An object of the present invention is the provision of a novel vibratory conveyor of generally panel-like configuration which is of simple construction and reliable operation, and provides a very thin cross sectional, thin panel construction which can be readily fabricated in modular form.

Another object of the present invention is the provision of a novel vibratory conveyor construction which facilitates selection of a wide variety of thrust and directional characteristics.

Another object of the present invention is the provision of a novel vibratory conveyor construction in the form of a thin sandwich-like panel having rigid upper and lower plates and an interposed body of foamed resilient material having an induced stress characteristic for imparting vertical and horizontal components of movement to the upper plate and to objects thereon upon vibration of the upper plate along a force axis parallel to the plane of the plates.

Another object of the present invention is the provision of a novel vibratory conveyor construction having graduated speed or thrust rates progressively diminishing from the center line of the conveyor to the lateral edges thereof or from a selected intermediate point toward an end of the conveyor.

Other objects, advantages and capabilities of the present invention will become apparent from the following detailed description, taken in conjunction with the accompanying drawing illustrating preferred embodiments of the invention.

Figure 4:
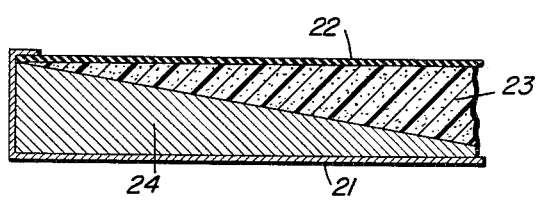
Figure 5:
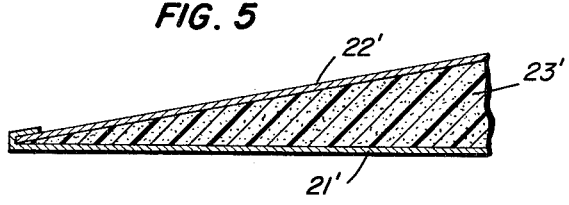

FIGURE 4 is a fragmentary vertical transverse section view through a modified vibratory conveyor unit embodying the present invention, constructed to provide conveyance thrust which diminishes progressively from the center longitudinal axis of the conveyor unit to the lateral edge thereof; and FIGURE 5 is a fragmentary vertical transverse section view of another form of the vibratory conveyor construction providing variable speed and thrust rates from the central longitudinal axis to the lateral edges of the unit.

Figure 1:
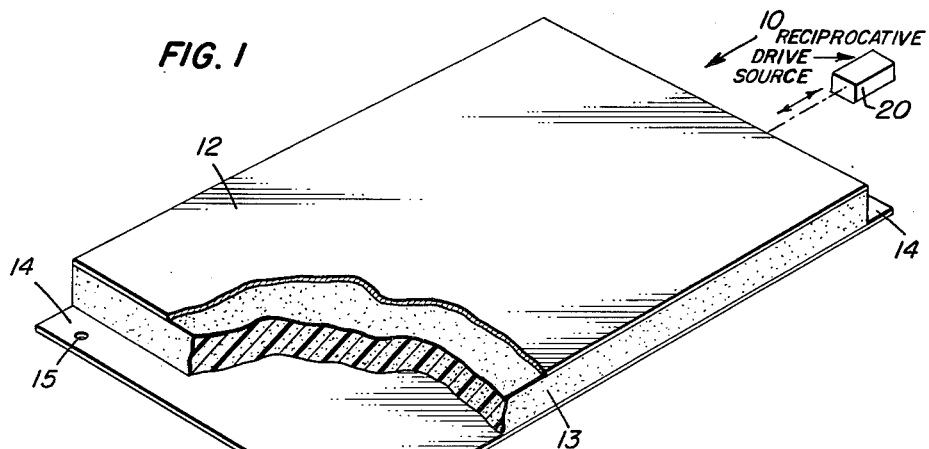
FIGURE 1 is a perspective view, with parts broken away, of a vibratory conveyor unit constructed in accordance with the present invention.
Figure 2:
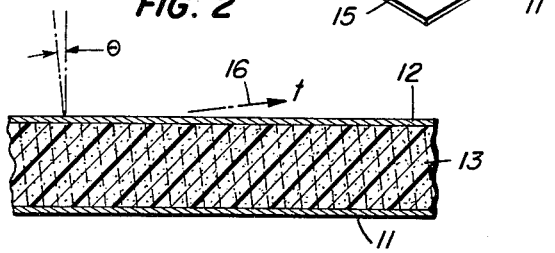
FIGURE 2 is a vertical longitudinal section view taken along the line 2—2 of FIGURE 1 and illustrating diagrammatically the inclined stressed axis induced in the intervening body of a foam material.
Figure 3:
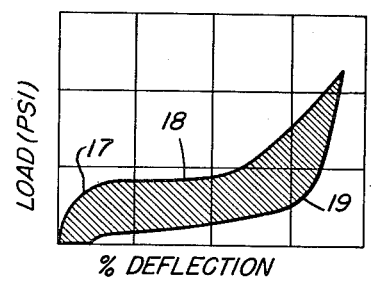
FIGURE 3 is an illustrative graph of the hysteresis loop characteristics present in the prestressed foamed material employed in the present invention.

Referring to the drawings, wherein like reference characters designate corresponding parts throughout the several figures, and particularly to FIGURES 1, 2 and 3 thereof, the simplest form of the vibratory conveyor of the present invention is in the form of a rectangular vibratory conveyor panel, indicated generally by the reference character 10, having a rigid planar rectangular bottom plate 11 and a rigid planar rectangular top plate 12, both formed for example of steel or other suitable metal, which are disposed in parallel with each other and forms a sandwich with an intervening body 13 formed of a closed-cell, foamed resilient material. The bottom or base plate 11 may be somewhat longer or wider than the upper plate 12 to provide end portions 14 which project beyond the adjacent edges of the upper plate 12 and resilient body 13 having holes 15 therein to receive screws or other fastening means for securely anchoring the unit to a stationary platform, floor, table or other fixed surface.

The body of resilient material 13 is preferably in the form of a rectangular block of closed-cell foamed material such as polyester urethane foam, which is bonded to the plates 11 and 12 in any suitable known manner and is stressed during curing thereof by slipping the upper plate 12 horizontally with relation to the lower plate 11 so that there is induced in the cured foam material 13 a pre-stressed condition providing a stress angle inclined to the vertical. Referring to a representative hysteresis loop curve for such a body of pre-stressed foamed resilient material, illustrated in FIGURE 3, it will be apparent that any rapid movement of the upper rigid plate 12 against the induced stress in the material, as for example along the horizontal axis indicated by the arrow 16 in FIGURE 2, will cause the material to at first resist, as indicated by the region 17 of the curve 18 in FIGURE 3 and follow the curve 18 to the right, and then relax and return to the starting position along the curve 19 of the graph. Thus, the effect of the hysteresis characteristics of the body of foam material 13 responsive to substantially horizontal vibratory movement of the upper plate 12 relative to the lower plate 11 will produce horizontal and vertical movement of the upper plate 12 and of objects disposed thereon to propel the objects along the direction of displacement of the vibratory force applied to the upper plate 12.

To explain the manner in which the necessary pre-stressed condition is achieved, polyurethane in its early foaming stages is like soap bubbles and as it cures the cell walls become toughened. If the material is initially foamed between two rigid sheets of material and the sheets are slowly shifted during the cure, all of the bubble like cells become elongated in the direction of strain or shift. The material toughens with the cells elongated. Now unlike a spring or rubber which will absorb, then repel shock forces with almost the same rate, urethane will absorb the force readily but will repel the force at a lesser rate. This is plotted graphically as the hysteresis loop shown in FIGURE 3. In the application of the material for vibratory conveyors stressed as above-mentioned to the angle theta, any horizontal shock (vibratory) movement of the upper plate 12, as viewed in FIGURE 2, to the left will be readily absorbed by the material resulting in little or no vertical movement between plates 11 and 12, yet when the material recovers back to its original position through opposing shock movements of the vibrator (second half of the vibrating cycle), the material recovery lags in such a way that the force to the right causes the vertical component and the resultant force to the material placed upon plate 12. An analogy might be to use an automotive shock absorber opposite to normal usage so that it may be readily stretched but not easily compressed. Now this shock absorber is used as a spacer between two plates and inclined by angle theta. The upper plate is moved to the left increasing angle theta and the absorber readily stretches, now when the plate is moved to the right, the absorber resists compression and causes the upper plate to rise. Angle theta approaches zero at approximately the same time as the maximum vertical movement from the resisting shock absorber is reached. The action of a particle upon the upper plate is in the direction $t$. Most of the movement of the particle is imparted in the initial part of the recovery cycle. Momentum of the particle carries it forward in a parabolic curve of a different order than that taken by the upper plate, hence the plate and the particle again come in contact during the latter part of the horizontal movement of the upper plate and its initial portion of the recovery parabolic arc. If springs or rubber material were used, recovery would approximate the line of initial displacement and fail to produce the necessary vertical vector.

This arrangement therefore provides an extremely simple construction for vibratory conveyors along the conveyor panel which may have a much thinner cross sectional area than has heretofore been practical and which will be highly reliable in operation.

It will be appreciated that any conventional means may be employed to impart reciprocative vibratory motion to the upper or top plate 12, as indicated diagrammatically by the reciprocative drive source 20 in FIGURE 1, coupled to the top plate by a suitable connecting rod or other conventional coupling means which will permit the vertical component of movement of the plate 12 imparted by the properties of the body of material 13.

This sandwich type vibratory conveyor construction employing upper and lower plates and an intervening body of prestressed foamed resilient material also facilitates the realization of a vibratory conveyor which has a graduated ratio of propelling thrust component with the greatest thrust rate along the central longitudinal axis of the conveyor body. This may be achieved in the manner illustrated in FIGURE 4, wherein parallel lower and upper plates 21 and 22 corresponding to the plates 11 and 12 in the previously described embodiments are provided, except that the upper plate 22 must now be of flexible material to accommodate different movement in different zones thereof. Between the plates 21 and 22 is interposed a body of closed-cell foamed resilient material 23 similar to the body of resilient material 13, but wherein the upper and lower surfaces of the body of resilient material are inclined to each other, converging progressively from the central longitudinal axis of the body 23 to the lateral edges of the body. A tapered rigid filler material 24 conforming in cross sectional configuration to the body of resilient material 23 completes the sandwich and fills the region between the upwardly and outwardly converging lower surface of the body of resilient material 23 and the lower plate 21. Since the thickness of the resilient foamed material 23 is greatest along the center line of the conveyor unit, the propelling thrust and component in the region of the center line of the conveyor unit in response to vibration of the upper plate 22 is considerably greater because the moment arm of the stress angle theta is longer in this region, and the propelling thrust component progressively diminishes at points progressing laterally toward the side edges of the panel. An alternate arrangement is illustrated in FIGURE 5, wherein the body of resilient foamed material 23' and upper panel 22' are of similar configuration and character as the elements 23 and 22 in FIGURE 4, but the filler 24 of FIGURE 4 is eliminated and the lower panel 21' is directly bonded to the material 23'. In both of the FIGURE 4 and FIGURE 5 forms, the upper panel 22 or 22' of flexible material must be provided with a rigid frame or similar means to impart horizontally directed vibrations to the upper panel.

While several preferred examples of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A vibratory conveyor comprising a stationary base member, a vibratory work member spaced above said base member and movable with respect thereto having an upwardly facing surface for supporting objects to be conveyed, said stationary base member and work member having confronting upper and lower surfaces, respectively, and an intervening body of closed-cell foamed elastomeric material substantially filling the space between said confronting surfaces and bonded to said confronting surfaces, said body of foamed material having a prestressed condition induced therein during curing thereof producing hysteresis characteristics whereby movement of the work member responsive to vibration of the work member to propel objects placed on the work surface along the work surface produces upwardly propelling force components and thrust components along the plane of the vibrating work surface to effect travel of objects placed on the work surface.

2. In a vibratory conveyor, the combination as defined in claim 1 wherein said intervening body of foamed material is foamed polyurethane.

3. A vibratory conveyor comprising a stationary base member, a substantially horizontal vibratory work member spaced above said base member and movable with respect thereto having an upwardly facing surface for supporting objects to be conveyed, said stationary base member and work member having confronting upper and lower surfaces, respectively, and an intervening body of closed-cell foamed elastomeric material substantially filling the space between said confronting surfaces and bonded to said confronting surfaces, said body of foamed material having a prestressed condition induced therein during curing thereof by shear straining of the upper surface thereof bonded to said work member relative to its lower surface producing a normal state of elongation of the cells in said body along parallel axes inclined at an acute angle to a vertical reference axis to produce propelling vertical and horizontal thrust components of said vibratory work member responsive to vibration thereof along a desired direction of object travel to propel along said direction the objects placed thereon.

4. A vibratory conveyor comprising a planiform stationary sheet metal base panel, a vibratory planiform sheet metal upper panel spaced above said base member and movable with respect thereto having an upwardly facing work surface for supporting objects to be conveyed, said stationary base panel and upper panel having confronting surfaces, and an intervening body in the form of a rectangular parallelopiped of closed-cell foamed elastomeric material substantially filling the space between the confronting surfaces of said upper panel and base panel bonded to said confronting surfaces, said body of foamed material having a prestressed condition induced therein during curing thereof providing normally elongated cells whose major axes are parallel to each other and inclined at an acute angle to the plane of the upper panel to produce hysteresis characteristics whereby movement of the upper panel responsive to vibration in a direction to propel objects along the work surface produces upwardly propelling force components and thrust components along the plane of the vibrating work surface to effect travel of objects placed on the work surface.

5. In a vibratory conveyor, the combination as defined in claim 4 wherein said intervening body of foamed material is foamed polyurethane.

6. A vibratory conveyor in the form of a sandwich-like block comprising a stationary rigid base panel member having a substantially planar upper surface, an upper vibratory panel member of rectangular rigid sheet material having a lower surface paralleling the upper surface of said base panel member and an upper surface paralleling the same forming a work surface to propel objects placed thereon along said work surface, and an intervening body of closed-cell foamed elastomeric material forming a substantially rectangular solid bonded to the lower surface of said vibratory panel member and the upper surface of said base panel member, said body of foamed material having a prestressed condition induced therein during curing thereof by shear straining of the upper surface thereof relative to its lower surface producing a normal state of elongation of the cells in said body along parallel axes inclined to the plane of said work surface at an acute angle to produce upwardly propelling and longitudinally propelling thrust components of said vibratory panel member responsive to vibration thereof along the desired direction of travel of the objects placed thereon and effect movement of the objects along said direction of travel.

7. In a vibratory conveyor, the combination as defined in claim 6 wherein said intervening body of foamed material is foamed polyurethane.

8. A vibratory conveyor comprising a stationary rigid base member having a substantially planar upper surface, an upper vibratory work member including a generally rectangular web arranged in a selected plane generally parallel to the desired path of movement of objects to be conveyed on an upper work surface thereof and formed of resiliently deformable sheet material lying in a plane converging relative to the plane of the upper surface of said base member from an intermediate region thereof to a marginal portion thereof, and an intervening body of closed-cell foamed elastomeric material forming an elongated prism bonded to a lower surface of said web of said vibratory work member and the upper surface of said base member, said body of foamed material having a prestressed condition induced therein during curing thereof by shear straining of the upper surface thereof relative to its lower surface producing a normal state of elongation of the cells in said body along parallel axes inclined to a vertical reference axis at an acute angle to produce upwardly propelling and longitudinally propelling thrust components of said vibratory work member of graduated intensity from said intermediate region to said marginal portion responsive to vibration thereof along the desired direction of travel of the objects placed thereon.

References Cited by the Examiner
UNITED STATES PATENTS 3,056,488 10/62 Musschoot.
3,123,203 3/64 Baker.
3,160,265 12/64 Hagenbook.
3,160,549 12/64 Caldwell et al. _____ 161—161

SAMUEL F. COLEMAN, *Primary Examiner.*